Dec. 11, 1928.                    1,694,986
N. SENSUI
PROTECTIVE ARRANGEMENT
Filed Feb. 1, 1927
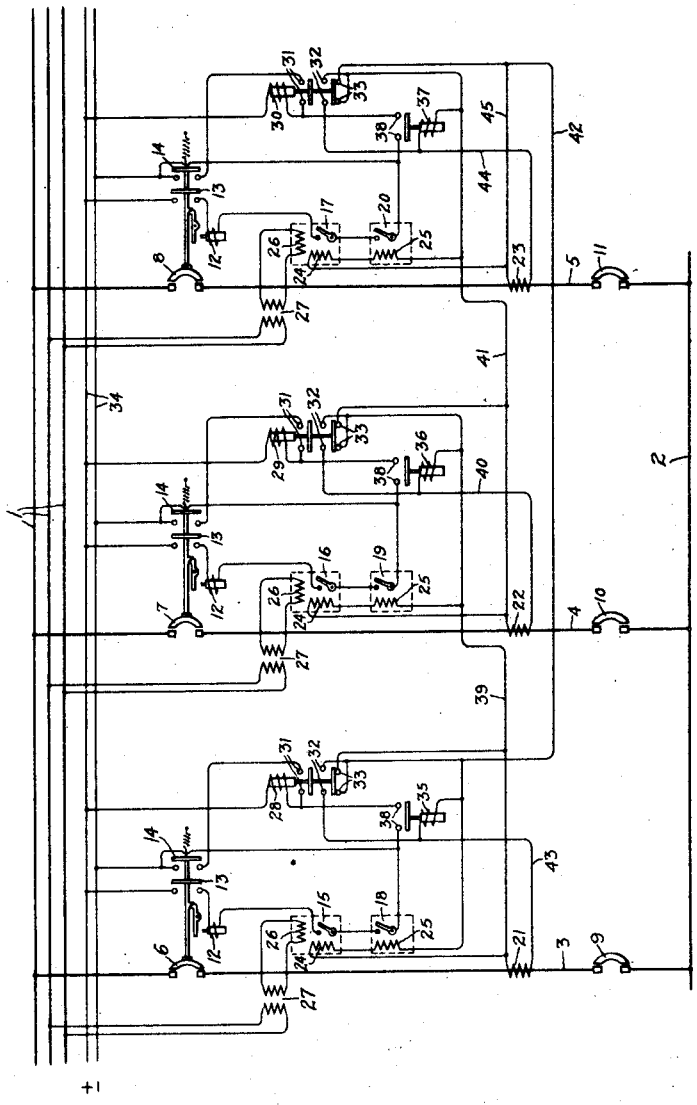
Inventor:
Nobuo Sensui,
by (signature)
His Attorney.

Patented Dec. 11, 1928.

1,694,986

UNITED STATES PATENT OFFICE.

NOBUO SENSUI, OF KANAGAWAKEN, JAPAN, ASSIGNOR TO GENERAL ELECTRIC COMPANY, A CORPORATION OF NEW YORK.

PROTECTIVE ARRANGEMENT.

Application filed February 1, 1927, Serial No. 165,200, and in Japan April 20, 1926.

My invention relates to improvements in protective arrangements, and more particularly to improvements in balanced protective arrangements for a plurality of parallel lines.

In balanced protective arrangements for parallel lines, when a line is disconnected, it is desirable to eliminate the protective apparatus of the line from the protective arrangement so as properly to maintain the balanced feature in the protective apparatus of the lines remaining in service. As previously done, the mere reclosing of the interrupting means at one end of a line has served to restore the protective apparatus of the line at said end. With this arrangement, if the interrupting means at both ends are not closed simultaneously, trouble arises due to the fact that the interrupting means first closed is operated on a balanced basis but without an actual balance. In consequence, particularly if the lines in service are heavily loaded, whenever an attempt is made to put a line in service, if the interrupting means at the receiving end is closed first, it is apt to be tripped, or if the interrupting means at the transmitting end is closed first, the lines already in service are apt to be disconnected. To avoid this difficulty, since it is not an economically feasible matter to insure simultaneous closing of the interrupting means at both ends, the protective relays have been given such settings that the efficiency of the protection peculiar to the balanced protective arrangement is decreased, since the possible sensitivity of operation is sacrificed.

An object of my invention is to provide an improved protective arrangement wherein all the features of the balanced protection of parallel lines are utilized to the greatest extent, and wherein the difficulties heretofore set forth are eliminated.

Another object of my invention is to provide an improved balanced protective arrangement wherein the control of the protective apparatus is such that continuity of service on sound lines is not impaired on the occurrence of unbalanced conditions.

My invention will be better understood from the following description, taken in connection with the accompanying drawing, and its scope will be pointed out in the appended claims.

In the single figure of the accompanying drawing, there is diagrammatically illustrated a balanced protective arrangement embodying my invention, and shown in single line diagram for clearness. In this illustrated embodiment of my invention, busses 1 and 2 are arranged to be connected by a plurality of parallel lines such as feeders 3, 4, 5, which are arranged to be controlled by suitable circuit controlling means, herein shown as comprising interrupting means such as circuit breakers 6 to 11 inclusive. Each of the circuit breakers 6, 7, and 8 is shown as equipped with a trip coil 12 and auxiliary switches 13 and 14, which are open when the circuit breakers are open and closed when the circuit breakers are closed.

For controlling the circuit breakers 6, 7 and 8 at one end of the lines, a balanced protective arrangement is provided. As illustrated, this arrangement comprises cooperating electroresponsive devices, such as power directional relays 15, 16, 17 and overcurrent relays 18, 19, 20. These protective relays are connected to respond to an unbalance in the line currents so as selectively to effect the opening of the circuit breaker in the line causing the unbalance. Although the arrangement is shown at only one end of the lines, it is of course understood that it may be provided at both ends and also that the power directional relays may in some cases be omitted.

For energizing the relays, the balanced protective arrangement further comprises transformers 21, 22, 23, arranged to be energized in accordance with the currents of the lines 3, 4, 5 respectively. These transformers are constructed and arranged so as to have their secondaries normally provide equal currents, and the secondaries are connected in a closed or loop circuit in series cumulative, that is, for circulating current under normal line conditions. In order to energize the protective relays in accordance with the unbalance or differential current due to any line abnormality, the current windings 24, 25 of the relays associated with each line are connected across the secondary of the current transformer associated with the line. The potential winding 26 of the power directional relays may be energized through transformers 27 connected to the bus 1.

In order to render the controlling means or protective apparatus associated with a line inoperative on disconnection of the line at one end, so as to operate the remaining lines on an actual balance, I provide means for removing from the closed circuit the transformer and the protective relay or relays associated with a line on the opening of the line circuit breaker at one end. As shown, this means comprises control devices such as contactors or control relays 28, 29, 30, each of which is provided with a circuit controlling member arranged to control three circuits. For this purpose, the control relays are provided with three sets of contacts 31, 32, 33. The contacts 31 and 32 are open when the control relay is deenergized, that is, when the circuit controlling member of the relay is in one position, and closed when the relay is energized, that is, when the circuit controlling member of the relay is in another position. The contacts 33 are closed when the control relay is deenergized, and open when it is energized. For energizing the control relays and also the circuit breaker trip coils, a suitable source such as a control bus 34 is provided. The contacts 33 of the control relay in each line are arranged when closed to short circuit the current windings 24, 25 of the protective relays associated with the same line and also to complete the transformer loop circuit without including therein the secondary of the transformer in the associated line. The contacts 31 of each control relay are sealing-in contacts which are arranged in series with the winding of the control relay and the auxiliary switch 14 of the circuit breaker in the corresponding line across the control bus 34. In this way, if the control relay is energized when the associated circuit breaker is closed, it will remain energized until the circuit breaker opens, and thereby maintain the protective apparatus controlling the circuit breaker in the operative condition as long as the circuit breaker is closed.

In order automatically to restore the protective apparatus to the operative condition only when the line circuit is reestablished at both ends, I provide suitable means such as restoring relays 35, 36, 37. As shown, these relays are operative in response to the flow of current in their respective lines, and for this purpose each relay is connected across the secondary of the transformer associated with the line. Each of these restoring relays, through its contacts 38, controls the circuit of the control relay in the associated line, so that when the restoring relay is energized, it effects the energization of the corresponding control relay to actuate the circuit controlling member thereof to one position only when the line circuit is completed at both ends and current is flowing.

In order that the restoring relays 35, 36, 37 may not be constantly energized when the lines are in service so as to avoid any possibility of erroneous operation of these relays on the occurrence of abnormal conditions as well as danger from over-heating, excess currents, etc., and also to eliminate their load, the control relays 28, 29, 30 are arranged when energized to effect the deenergization of the restoring relays. This may be done as shown by having the contacts 32 of the control relays, when closed, short circuit the windings of the corresponding restoring relays.

In the drawing, the parts are shown in the positions for all lines disconnected at both ends, and the operation of putting a line, such as the feeder 3, into service will first be explained. To do this, the circuit breakers 6 and 9 are closed. The order of closing is immaterial, since the restoring relay 35 is not energized until current flows in the line 3. When this relay is energized, it operates preferably substantially instantaneously and through its contacts 38 completes the circuit of the control relay 28. This relay also operates preferably substantially instantaneously and seals itself in through its contacts 31 and the closed auxiliary switch 14 of the circuit breaker 6. The closing of the contacts 32 of the control relay 28 short-circuits the restoring relay 35, which is therefore only momentarily energized. The opening of the contacts 33 of the control relay 28 removes the short-circuit from the current windings 24, 25 of the protective relays 15 and 18. All of the lines may be put in service in a manner similar to that described. As each line is put in service, the secondary of the current transformer associated with the line is connected in series with the secondaries of the transformers of the line or lines already in service. Thus, assuming that lines 3 and 4 are in service, a closed loop circuit including the secondaries of the transformers in series cumulative will be completed as follows:—secondary of the transformer 21, conductor 39, contacts 32 of control relay 29, conductor 40, secondary of transformer 22, conductor 41, contacts 33 of control relay 30, conductor 42, contacts 32 of control relay 28, and conductor 43. In this way, it will be apparent that the balanced or loop circuit for the three lines in service is secondary of the transformer 21, conductor 39, contacts 32 of the control relay 29, conductor 40, secondary of transformer 22, conductor 41, contacts 32 of control relay 30, conductor 44, secondary of the transformer 23, conductors 45 and 42, contacts 32 of control relay 28 and conductor 43.

Now, if it be assumed that all lines are in service and a fault occurs on the line 4, for example, of such a character as to effect the operation of the protective relays 16 and 19, these will complete the circuit of the trip coil 12 of the circuit breaker 7 and thereby disconnect the line 4 at this end. At the other end, the line will be disconnected in response to the apparatus, not shown, controlling the circuit breaker 10. When the circuit breaker 7 and the auxiliary switch 14 associated there-with open, the sealing-in circuit of the control relay 29 is interrupted, and this relay is consequently deenergized. The closing of the contacts 33 of this relay short-circuits the current responsive windings 24 and 25 of the protective relays 16 and 19. The opening of the contacts 32 of the control relay 29 removes the short-circuit on the restoring relay 36, so that it is again ready to respond when current is flowing in the line 4. The transformer 22 is now removed from the loop circuit, which is secondary of transformer 21, conductor 39, contacts 33 of control relay 29, conductor 41, contacts 32 of control relay 30, conductor 44, secondary of transformer 23, conductors 45 and 42, contacts 32 of control relay 28 and conductor 43. The balanced protective feature is, therefore, established for the lines 3 and 5, which remain in service, and will be maintained for these lines until current flow occurs in the other line 4 or lines when the balance feature will be expanded to include the additional line or lines as heretofore explained.

Although I have shown three lines in single line diagram for clearness, the application to more or less than this number, as well as to the other phase conductors of the lines, will be obvious to those skilled in the art.

While I have shown and described my invention in considerable detail, I do not wish to be limited to the exact arrangement shown, but seek to cover in the appended claims all those modifications that fall within the true spirit and scope of my invention.

What I claim as new and desire to secure by Letters Patent of the United States, is:—

1. In an electric system wherein parallel lines are arranged to be disconnected at both ends and wherein a protective arrangement is provided at one end for selectively disconnecting a faulty line, means for rendering the protective apparatus of a line inoperative on disconnection of the line at one end and electroresponsive means arranged to be energized momentarily only on reconnection of the line at both ends for automatically restoring the protective apparatus of said line to the operative condition.

2. In an electric system for parallel lines, a balanced protective arrangement for selectively disconnecting a faulty line, means for rendering the protective apparatus of a line inoperative on disconnection of the line at one end and electroresponsive means arranged to be energized momentarily only when the line circuit is reestablished at both ends for automatically restoring said line protective apparatus to the operative condition.

3. In an electric system for parallel lines, a balanced protective arrangement for selectively disconnecting a faulty line, means for rendering the protective apparatus of a line inoperative on disconnection of the line at one end and means arranged to be energized momentarily on a flow of current in said line for restoring the protective apparatus thereof to the operative condition.

4. In combination, parallel lines, means for interrupting the lines at both ends, means associated with said lines for controlling the interrupting means at one end operative in response to unbalanced currents in said lines selectively to open the interrupting means in the line causing the unbalance, means for rendering the controlling means associated with a disconnected line inoperative and means responsive to the current in the line for restoring said controlling means to the operative condition and maintaining the same in said condition as long as the interrupting means at said end of the line is closed.

5. In combination, parallel lines, interrupting means therefor, and electroresponsive circuit controlling means operative in response to unbalanced currents in said lines selectively to effect the opening of the interrupting means in the line causing the unbalance including transformers arranged to be energized in accordance with the currents in the respective lines, a circuit including the secondaries of the transformers connected in series, a relay for each line connected across the secondary of the transformer associated with the line, means operative to one position by the opening of the interrupting means of a line for removing from said circuit the transformer and the relay associated with the disconnected line and to another position in response to a re-establishment of current flow in the line for restoring the relay and the transformer to said circuit.

6. In combination, parallel lines, means for interrupting the lines at both ends and means for controlling the interrupting means at one end including transformers arranged to be energized in accordance with the currents in the respective lines, a circuit including the transformer secondaries connected in series, a protective relay for each line connected across the secondary of the transformer associated with the line, means operative on the opening of the interrupting means in a line at said end to short circuit the transformer and the protective relay associated with said line and means associated with said line for opening said short circuit when the interrupting means at both ends of the line are closed, and comprising a relay arranged to be energized momentarily in accordance with the current in the line.

7. In combination, parallel lines, means for interrupting the lines at both ends, means associated with said lines for controlling the interrupting means at one end operative in response to unbalanced currents in said lines selectively to open the interrupting means in the line causing the unbalance, means for rendering the controlling means associated with a disconnected line inoperative and electroresponsive means arranged to be energized momentarily when the interrupting means at both ends of the line are closed for restoring said controlling means to the operative condition.

8. In an electric system comprising parallel lines, a protective arrangement for selectively disconnecting a faulty line, controlling means operative to one position on disconnection of a line at one end for rendering the protective apparatus associated with the line at said end inoperative and to another position for restoring the line protective apparatus to the operative condition and maintaining said apparatus in said condition as long as the line is connected at said end and means operative in response to a flow of current in said line for actuating said controlling means to said other position.

9. In an electric system including parallel lines, a protective arrangement for selectively disconnecting a faulty line, electroresponsive means operative to one position on disconnection of a line at one end to render the protective apparatus associated with the line at said end inoperative and to another position in response to a flow of current in the line to restore the line protective apparatus to the operative condition and to maintain the same in said operative condition as long as the line is connected at said end.

10. In an electric system comprising parallel lines, interrupting means therefor and a balanced protective arrangement for selectively disconnecting a line causing unbalance including control means for each line arranged to be deenergized by the opening of the circuit interrupting means of the line for rendering the protective apparatus associated with the line inoperative, a relay operative in response to a flow of line current for energizing said control means whereby to restore the line protective apparatus to the operative condition arranged to be deenergized in response to the energization of said control means, and means for maintaining the control means energized as long as the interrupting means of the line is closed.

In witness whereof, I have hereunto set my hand this 11th day of January, 1927.

NOBUO SENSUI.